United States Patent [19]
Lorscheider et al.

[11] Patent Number: 6,077,108
[45] Date of Patent: Jun. 20, 2000

[54] PATCH PANEL WITH RETRACTABLE PATCH CORD

[75] Inventors: Jörg Lorscheider, Dana Point, Calif.; Dean R. Zalesky; Peter J. Lotinsky, both of Denver, Colo.

[73] Assignee: Krone GmbH, Germany

[21] Appl. No.: 09/001,914

[22] Filed: Dec. 31, 1997

[51] Int. Cl.[7] .................................................. H01R 13/72
[52] U.S. Cl. ............................................. 439/501; 439/4
[58] Field of Search .................................. 439/4, 11, 13, 439/501, 79, 701, 709

[56] References Cited

U.S. PATENT DOCUMENTS

| | | | |
|---|---|---|---|
| 4,722,494 | 2/1988 | Fairchild | 439/4 |
| 5,481,607 | 1/1996 | Hsiao | 439/4 |
| 5,494,446 | 2/1996 | DeLucia et al. | 439/4 |

*Primary Examiner*—Khiem Nguyen
*Attorney, Agent, or Firm*—McGlew and Tuttle, P.C.

[57] ABSTRACT

A patch panel is provided comprising a patch panel housing, a first electrical connector a second electrical connector connected to the patch panel housing and an electrical interconnect for connecting the first electrical connector and the second electrical connector and for maintaining electrical connection between the first electrical connector and the second electrical connector while allowing the first connector to be moved both away from and toward the housing, for adjusting a position of the first electrical connector with respect to the housing.

20 Claims, 9 Drawing Sheets

PATCH PANEL WITH RETRACTABLE PATCH CORD

FIELD OF THE INVENTION

The invention relates to wire patch connecting devices and more particularly to a patch panel providing a convenient connection point for telecommunication and data applications.

BACKGROUND OF THE INVENTION

Patch panels provide a structure for changing connections in telecommunication and data applications. In local area network applications, patch panels may be provided between a data hub and a workstation. Connection links may be run from the workstation to the patch panel and from the data hub to the patch panel. The patch panel allows for convenient initial connections and allows for an efficient reorientation or reorganization of the connections between the workstation and the data hub.

Patch panels are known which provide a modular jack interface, particularly with modular jack outlets. The outlets are preferably provided with labels such that a user (e.g. information system manager) can reorder and reconfigure the various workstation connections to a network data hub. Similar arrangements may be used for telephone systems.

Recent improvements to patch panels focus on the modular jack interface, to improve the electrical performance of the patch panel. This is especially necessary for establishing an electrical link for high speed data transmission. For this purpose, cabling (wires) have been employed which also are adapted for high speed transmission. Connection elements (jack plugs etc.) have also been developed for high speed transmission.

An important feature of a patch panel configuration is its ability to adapt a system to changes as to the various electrical links (such as changes in connections). Because local area network physical arrangements are often changed, there is a need to keep cabling on hand for various possible physical connections. This can be especially problematic when new data hubs and the like are added which require cabling of various different lengths to extend from the patch panel to the hub (or between patch panels). The task of purchasing and maintaining on hand various different lengths of high performance cabling has become quite problematic and results in extremely high costs.

SUMMARY AND OBJECTS OF THE INVENTION

It is a primary object of the invention to provide a patch panel which provides a high performance link including a first electrical connector and a second electrical connector and an electrical connection between the first electrical connector and second electrical connector and which also provides for the ability to move the first electrical connector relative to the second electrical connector to make a connection to various different external devices, spaced at various different locations from the patch panel.

According to the invention a patch panel is provided comprising a patch panel housing, a first electrical connector means and a second electrical connector means connected to the patch panel housing and electrical interconnect means for connecting the first electrical connector means and the second electrical connector means. The interconnection means maintaining electrical connection between the first electrical connector means and the second electrical connector means while allowing the first connector means to be moved both away from and toward the housing, for adjusting a position of the first electrical connector means with respect to the housing.

The electrical interconnect means comprises an electrically conductive wire extending uninterrupted between the first connector and the second connector. At least one spool is preferably provided with a first wire portion of the wire wrapped around a first spool part and a second wire portion of the wire wrapped around a second spool part. The first portion of the wire is disposed to be extended from (paid off) the first spool part for changing a position of the first connector means relative to the housing.

The second wire portion is preferably approximately one half the length of the first wire portion. The electrically conductive wire is an integral, uninterrupted wire with a transition between the first wire portion and second wire portion preferably occurring as the wire passes through a center of the spool. As the first wire portion is paid out, the second wire portion remains in the second spool part. This second spool part forms the storage region.

The spool is preferably connected to a spring means for exerting a spring force on the spool for maintaining the first wire length in a retracted state. A ratchet means is preferably provided for fixing a rotational position of the spool.

A cartridge case is preferably provided supporting the spool. The cartridge case is positioned within the housing and can be removed from the housing to access the spool and wire. This allows the user to change the wire if the wire is not providing the proper performance. The cartridge preferably includes an additional spool mounted therein. The second spool has an additional first connector part, an additional second connector part and an additional electrical interconnect means connected to the first connector part and the second connector part. A plurality of the cartridges are preferably disposed in the housing.

The patch panel of the invention provides significant advantages. The structure including the single uninterrupted integral wire extending from the first connection means to the second connection means provides superb performance. The connection allows for high speed transmission over the length established by the patch panel (between the first connection means and second connection means). The first connection means is able to be moved away from and back toward the patch panel without storage problems as to the length of wire which remains in the patch panel, and without a moving connection such as an electrical connection based on two moving parts or slip rings. This is achieved by the novel storage of the second wire portion, in the second spool part or in spool storage region. The extension of the first wire part and the retraction of the first wire part occurs without significant physical twisting or harm to the wire, thereby ensuring the integrity of the electrical link and providing the capability for high speed (high frequency) transmission.

By disposing the second wire portion in the spool storage space and wound in the same direction as the winding of the first wire portion, the second wire portion unwinds in a first rotational direction within the storage space and subsequently begins winding again in a second rotational direction as the first wire part is moved beyond half of its full extension toward the full extension. This arrangement allows the second wire part to be approximately half the length of the first wire part such that less wire is stored than is paid out of the patch panel. The orientation and provision of the second wire part such that it unwinds in a manner to extend outwardly toward a periphery of the spool storage space before winding at the spool storage space core, in a direction opposite its original wound direction, provides an orderly transition from a first winding direction to a second winding direction, providing a smooth payout of the first wire portion without problems as to the second wire portion. That is, there is no problem with the portion of the wire extending from the first wire portion to the preferably fixed second connection means.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
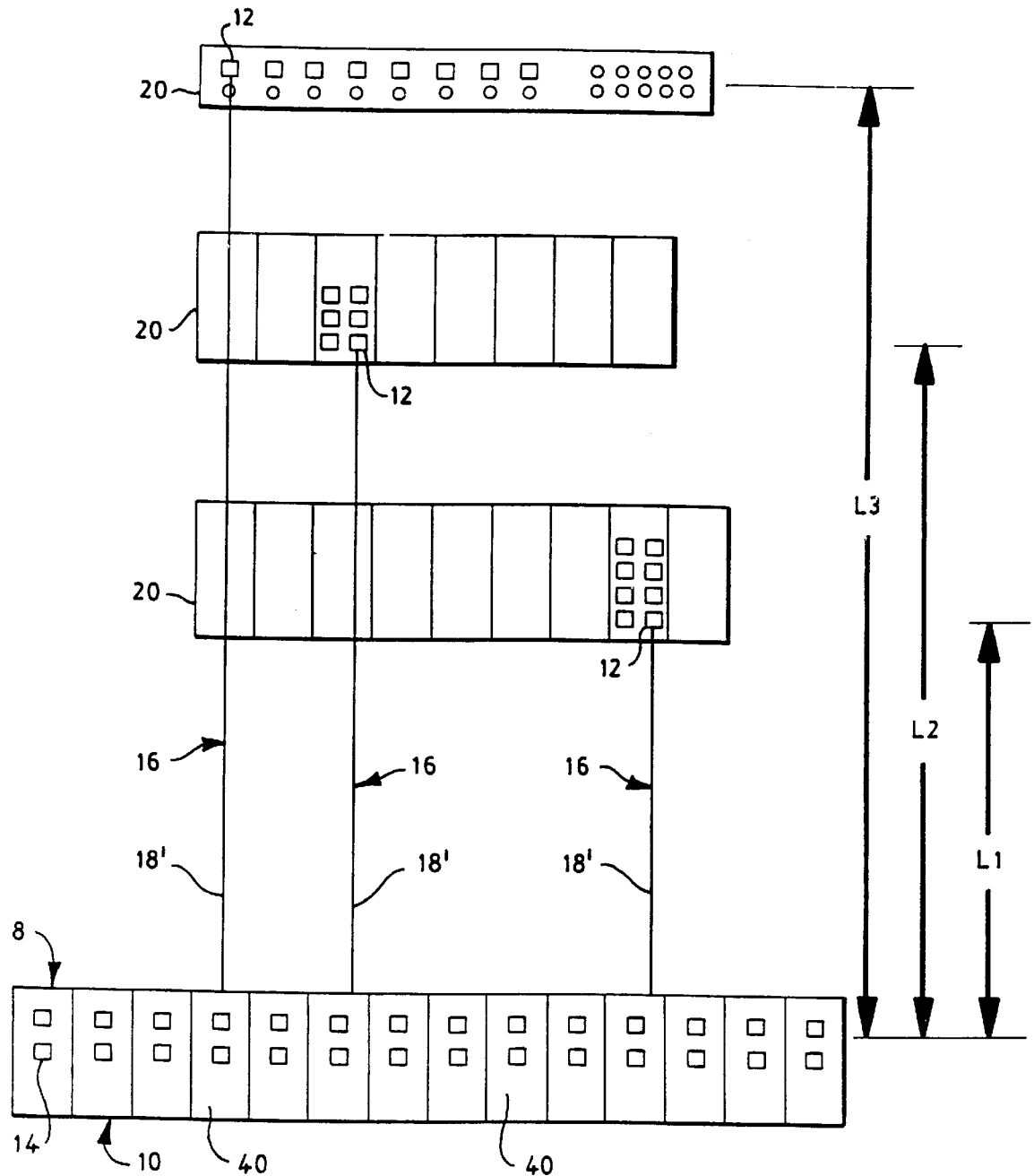
FIG. 1 is a schematic view showing the patch panel of the invention with various connected devices.

Referring to the drawings in particular, the invention comprises a patch panel generally designated 8. The patch panel includes a housing 10 and a plurality of first electrical connectors 12 and a plurality of second electrical connectors 14 (see FIG. 6). The patch panel 8 further includes physical and electrical interconnection means 16. The interconnection means 16 provides a connection line or link between each first electrical connector 12 and each second electrical connector 14.

The interconnection means 16 is formed of a continuous uninterrupted wire 18. Preferably wire 18 includes a wire formed of at least one integral continuous wire strand. The wire 18 includes an extendable wire portion 18' and a stored wire portion 18" (see FIG. 4).

The patch panel 8 of the invention may be used in a situation as shown in FIG. 1. A plurality of data hubs 20 may be provided. A distance (L1, L2, L3, etc.) between the patch panel and the devices to be connected such as data hubs 20 is different for each device.

If it is necessary to rearrange the connections between the patch panel 8 and the data hubs 20 wire portion 18' may be extended as needed. Various lengths of patch cords are not needed for making the various connections. The invention provides a retractable electrical interconnection means, namely the electrical interconnection means between the first electrical connector 12 and a second electrical connector 14. With this structure, no patch cords are necessary at all. The electrical connection between first electrical connector 12 is via an extendable/retractable cord, namely the extendable wire portion 18' of uninterrupted wire 18.

Figure 2:
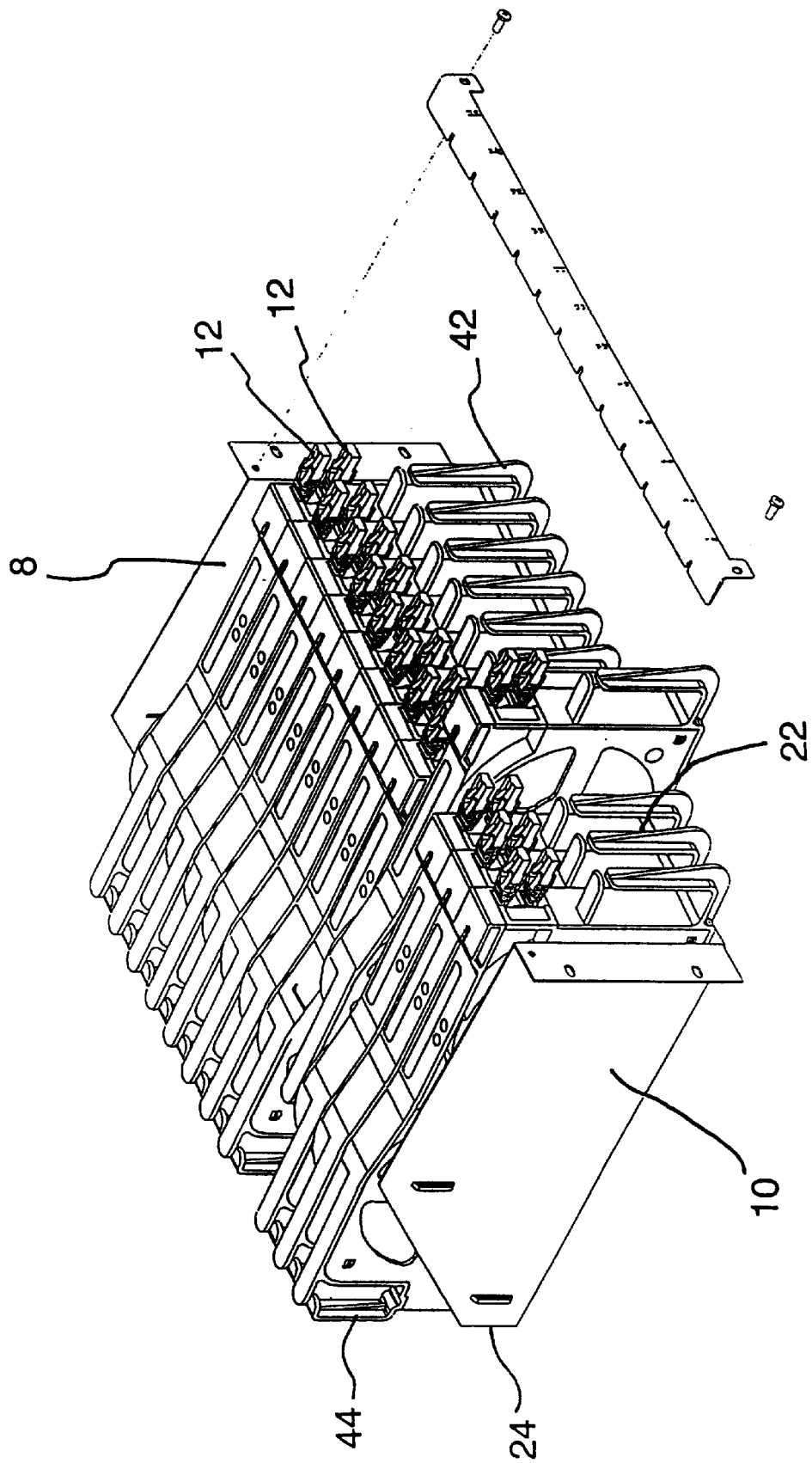
FIG. 2 is a perspective view of the patch panel device according to the invention including the housing and various retractable cable cartridges.

FIG. 2 is a representation of the patch panel 8 with a housing generally designated 10. The patch panel 8 includes a front face 22 with a plurality of the first electrical connectors 12. Additionally, the patch panel 8 includes a rear face 24. The rear face 24 also has a plurality of the electrical connectors, namely second electrical connectors 14 (see FIG. 6). The housing 10 supports cassettes or cable cartridges 40. Each cartridge 40 has two first electrical connectors 12 and two second electrical connectors 14.

The invention provides a plurality of cartridges 40 which each support two spools 30. Each cartridge 40 preferably includes a wire management element 42 on a front face 22 and a wire management element 44 on the rear face 24. The cartridge 40 is provided to be extractable from the shell of the housing 10 as shown 2. In the case of a problem with any of the lines, a cartridge 40 is removed from the shell of housing 10 allowing the spool 30 to be removed from the cartridge. The wire 18 may be replaced on the spool 30 or a new spool 30, with wire 18 may be positioned back in the cartridge with the first contact 12 and second contact 14 disposed at the front face 22 and rear face 24 respectively. This arrangement provides a practical mechanism for replacing lines which do not function or do not perform to the proper level.

Figure 3:
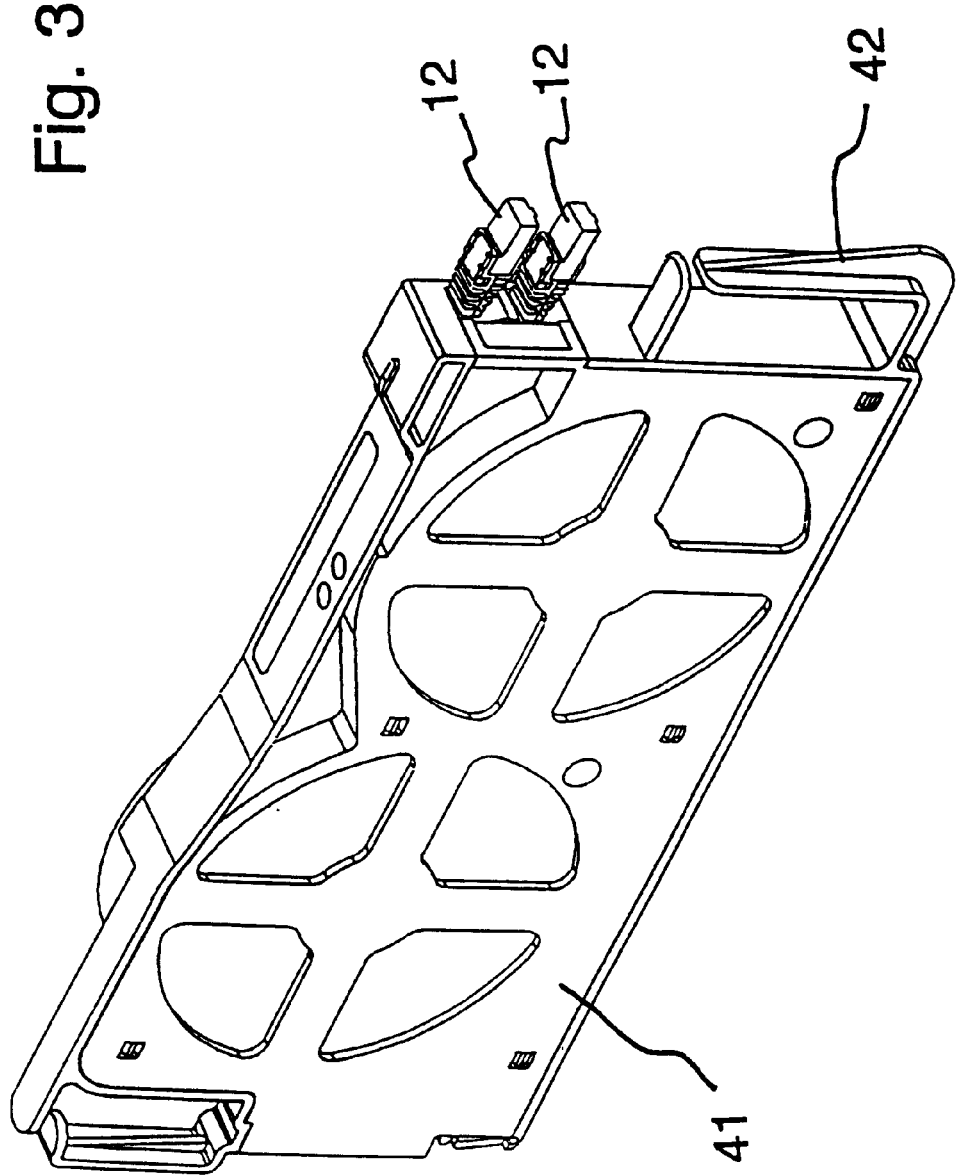
FIG. 3 is a perspective view of a retractable cable cartridge.

FIG. 3 shows the cartridge 40 removed from the housing 10. A front plate 41 covers the spools 30.

Figure 4:
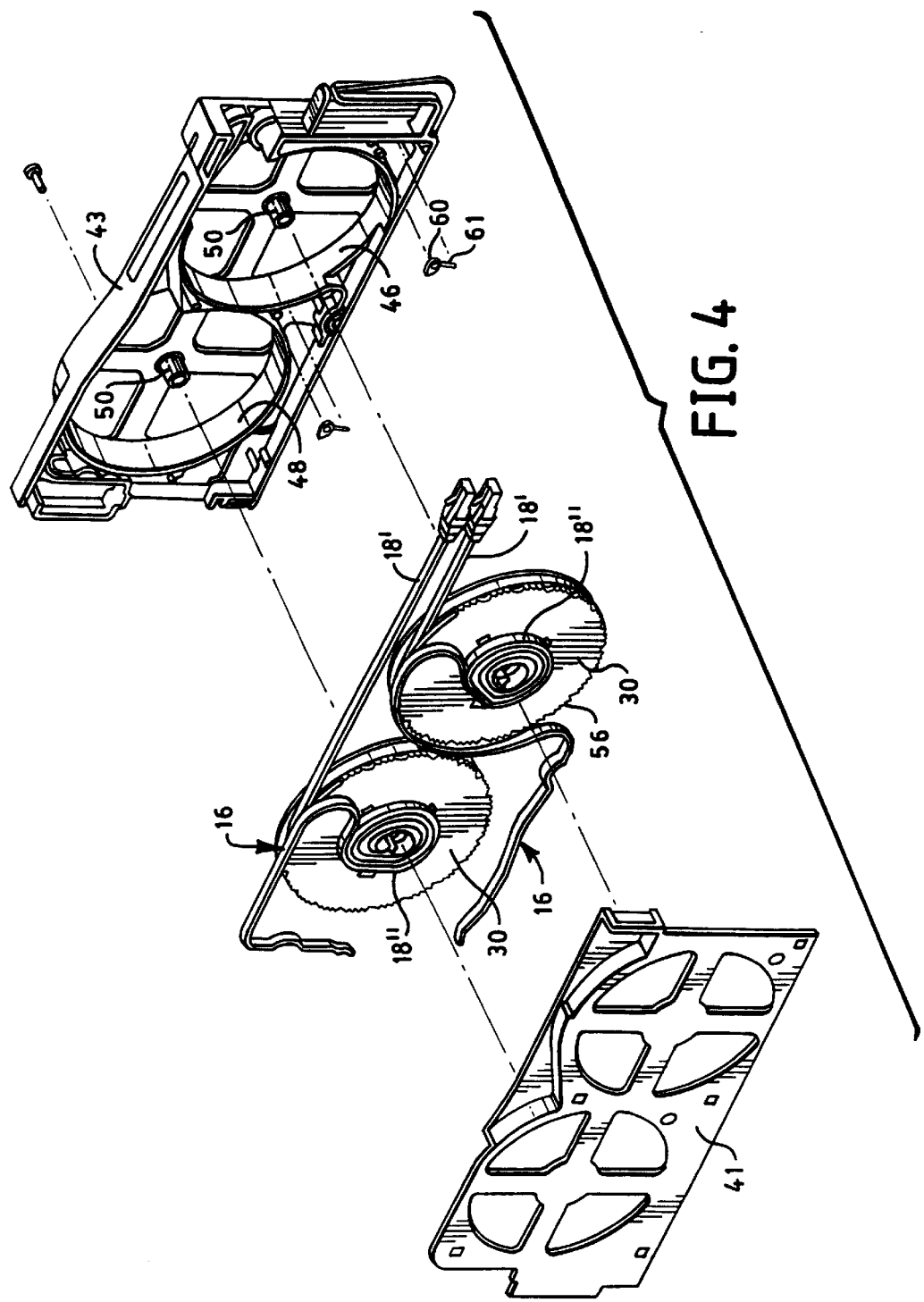
FIG. 4 is a perspective exploded view of a retractable cable cartridge.

As can be seen in FIG. 4, each cartridge 40 includes a support structure 43 with a front spool receiving area 46 as well as a rear spool receiving area 48. The two first electrical connectors 12, the two second electrical connectors 14 and the associated wires 18 are provided with each cartridge 40. This arrangement provides for a connector density which is similar to standard patch panels, namely rows of two connectors.

Figure 5:
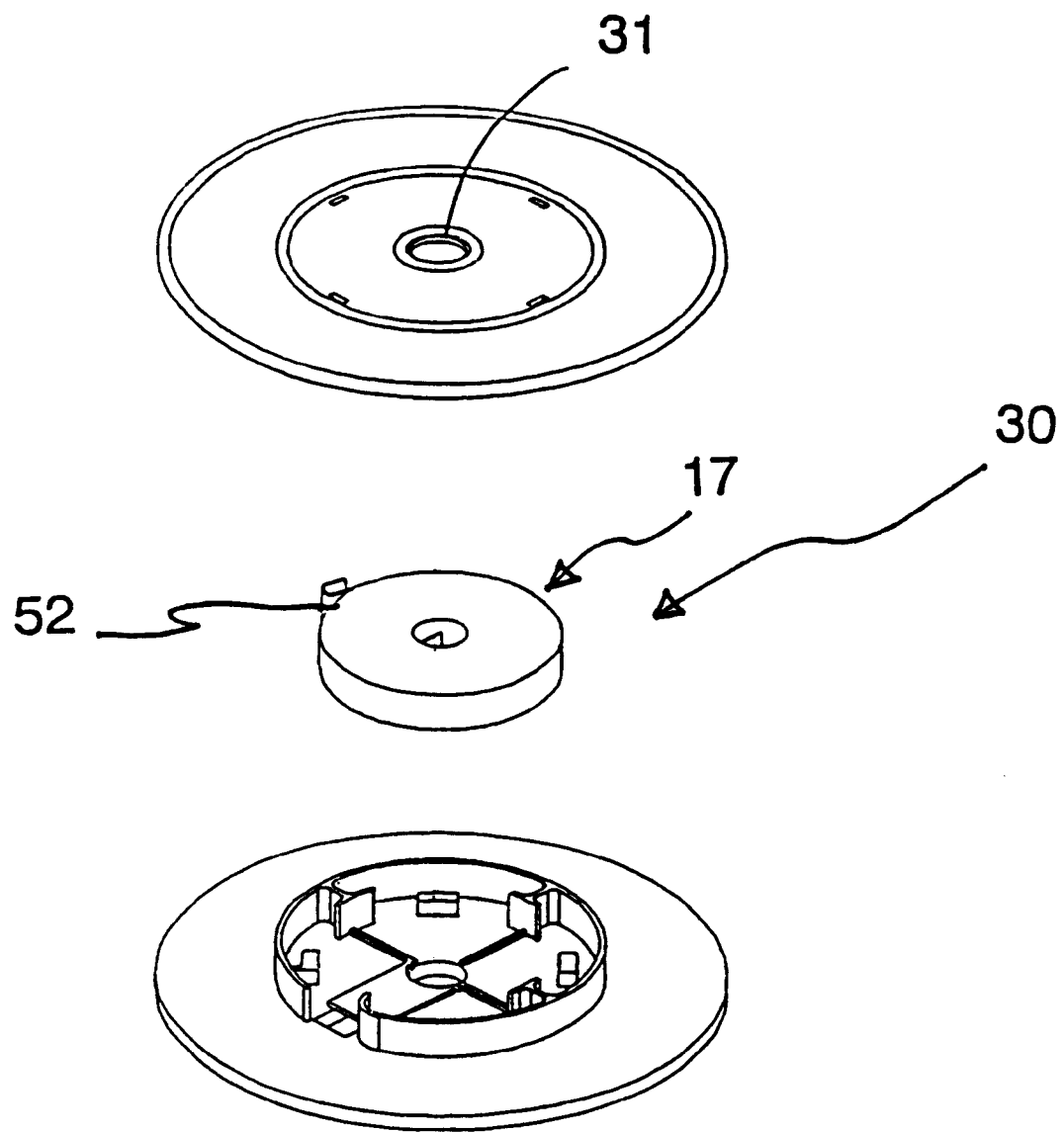
FIG. 5 is a perspective exploded view of a spool showing spool halves and a spring motor.

Each spool 30 is connected to the cartridge 40 with an interior surface of its core 31 supported via a bearing element 50. Bearing element 50 is preferably merely a cylindrical element for supporting the spool 30 in rotation. Additionally, spring means 17 (see FIG. 5) in the form of a spring motor 52 is provided for assisting in retracting the wire portion 18', after it has been extended. The spring 52 provides a rotational bias whereby as the wire portion 18' is paid out, there is a force exerted on the wire for retracting the wire. To avoid placing the wire under too much stress, ratchet means 53 is provided associated with each of the front spool receiving region 46 and the rear spool receiving region 48. Each rachet means includes teeth 56 provided on each spool 30 and a pawl element 60 connected to a spring 61. The pawl element 60 can be moved into engagement with the gear teeth of a transmission gear or gear teeth 56, thereby holding the spool 30 in position and also eliminating the rotational biasing force which otherwise would be applied to wire 18.

The electrical interconnection means 16 according to the invention is based on a single continuous line (wire) 18 which extends from the first electrical connector 12 to the second electrical connector 14. This interconnection means 16 is provided in the form of a wire 18 which is stored in the patch panel 8 until it is used. During use, the wire portion 18' extends out of the patch panel.

Figure 6:
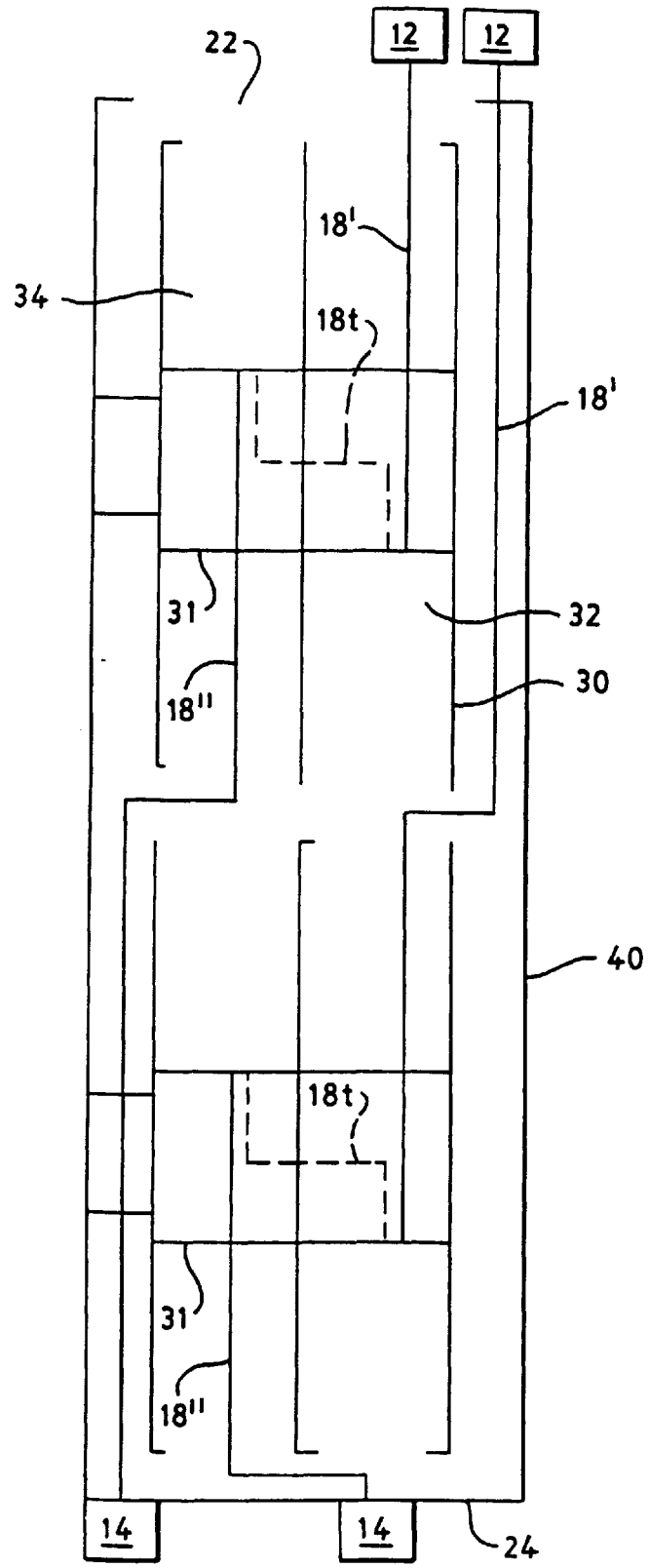
FIG. 6 is a schematic cross-sectional view of a cartridge according to the invention.

The feeding and spools 30 pay out the connection wire portion 18' and store the connection wire portion 18". The connection wire portion 18' may be retracted to position it for storage. A feeding and storage means is formed of the spool generally designated 30, a spring means 17 and the rachet means (including pawl element 60, teeth 56 and spring 61). As can be seen in FIG. 6, each spool 30 includes a payout spool half 32 and a storage spool half 34. The payout spool half 32 provides the space for storing the extendable wire portion 18' which is to be paid out, to the extent necessary to connect the first connection means 12. The other half. of the wire 18, the stored portion 18", is disposed in the storage area 34. This stored portion 18" in storage area 34 is approximately equal to one half of the length of the extendable portion 18' (one half of the maximum amount of wire 18 which can be extended out of the patch cord 10). As wire 18 is single, continuous integral wire extending from the first connector 12 to the second connector 14, there is a transition portion 18t between wire portions 18' and 18", in the core 31 of the spool 30. Further, the length of wire from connector 14 to the spool storage space 34 is preferably constant (does not change). This provides a significant advantage according to the invention that a single non-interrupted electrical line is provided from the first connector 12 to the second connector 14. This materially enhances the performance of the device and removes problems with regard to transmission of an electrical signal between moving parts. However, this results in the significant requirement that the maximum payout length of extendable wire 18' is limited by the storage of the remaining portion of wire 18.

The connector 14 is directly connected to wire 18 which feeds into the storage space 34 and crosses over into the payout region 32. The distance between the crossover point and the point in which wire 18t exits the spool 30, substantially corresponds to the distance from the crossover point to the first connection element 12. The same relationship is provided with regard to the rear spool 30 and associated front first connecting element 12, rear first connecting element 14 and interconnection wire 18.

The invention provides a unitary or single wire connecting the first wire connection element and the second wire connection element. In order to use a single non-interrupted continuous wire 18, to provide for the wire interconnection means 16, there must be an amount of wire 18" stored on the spool in the storage space 34 which is less than or equal to the amount of wire stored on the spool in payout space 32, when the wire is fully retracted. Using an equal length for storage could lower the performance of the patch panel. This also could be problematic with regard to the physical storage of the portion of the wire 18 which remains fully within the patch panel at all times.

According to the invention, a wrapping technique is used for the stored portion of the wire 18". This allows only approximately half of the wire to be deployed on the storage space side 34 as compared to the payout side 32. The wire 18' which is paid out from the payout space 32 is about twice the length of wire 18", to be deployed within the storage space 34.

When the wire 18 is approximately extended a half of its maximum distance, a full amount of stored wire 18 has been unwound in the space 34 in a first rotational direction. As the wire 18 is further extended from the patch panel, the stored part of the wire 18 reverses itself from being unwound in a clockwise direction (for example) to being wound in a counter clockwise direction.

Figure 7:
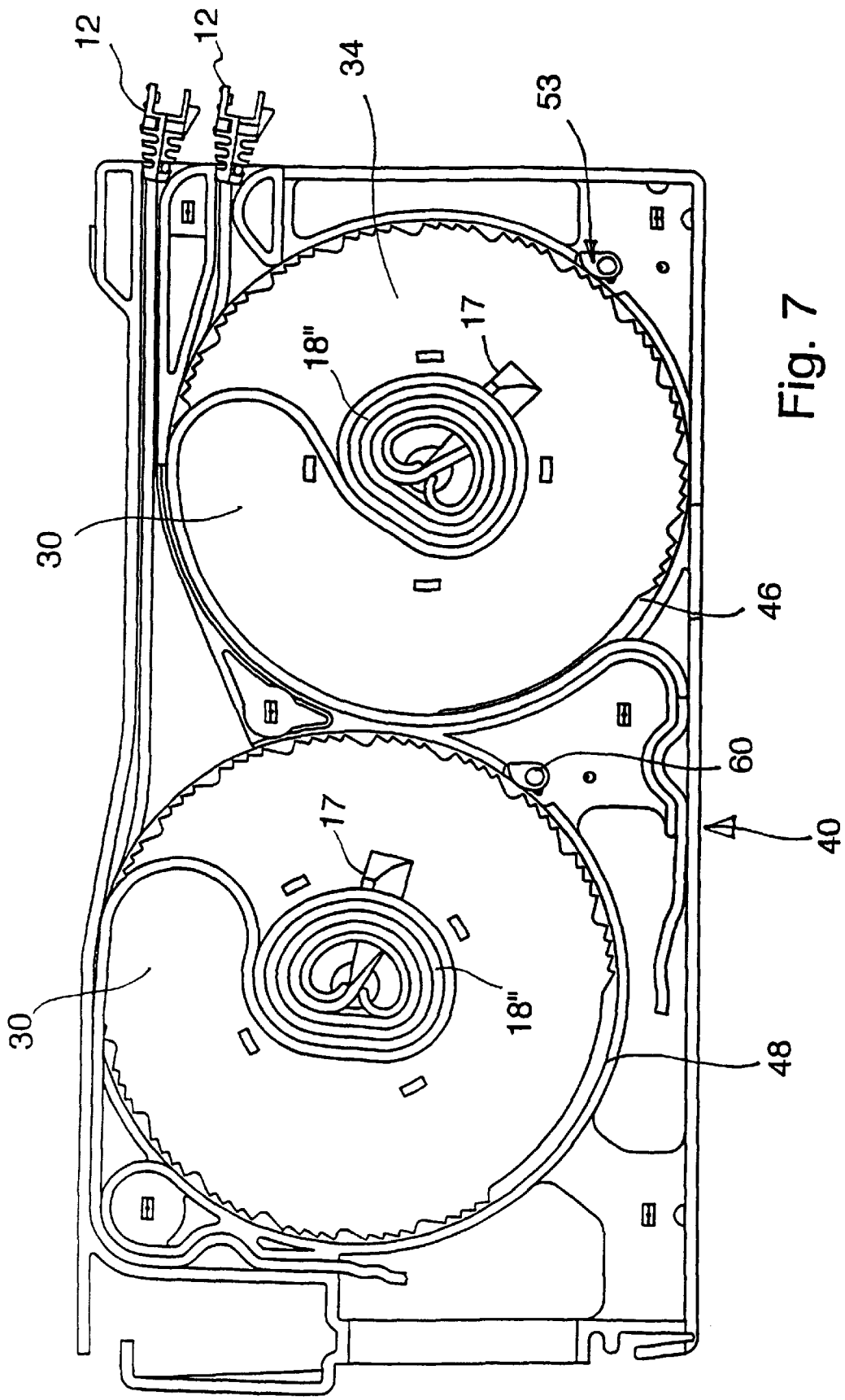
FIG. 7 is a side view of a cartridge showing the storage spool half with the retractable wire in a fully retracted position.
Figure 8:
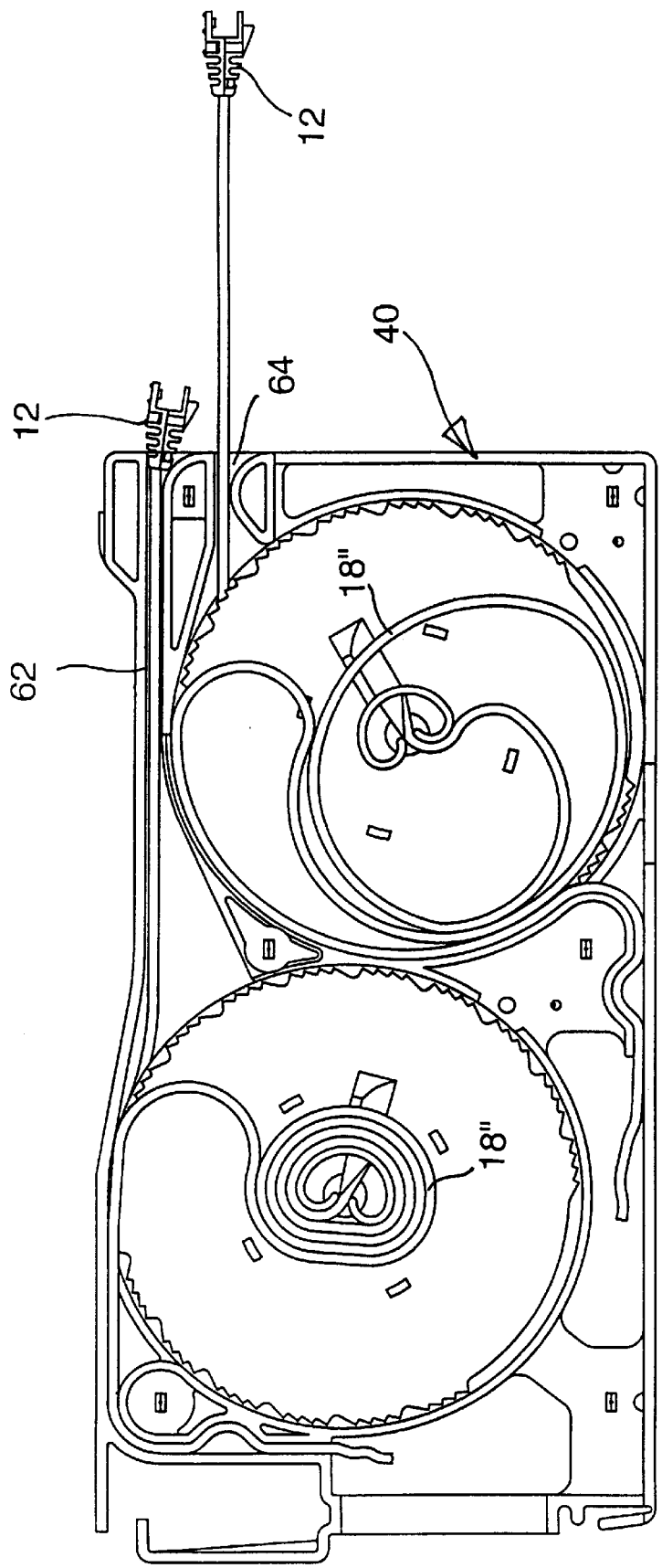
FIG. 8 is a side view of a cartridge showing the stored wire portion with the extendable wire portion being extended almost 50% of its full extension length with the stored portion of the wire starting to extend outwardly toward the periphery of the spool storage space prior to winding itself in a direction opposite its original direction of winding.

FIG. 7 shows the state of the stored wire portion 18", and the spool storage space 34 when the extendable part of wire portion 18' is in a retracted position. As can be seen, the stored wire portion 18" is fully wound. Rotation in a clockwise direction, and extension of the wire portion 18' from the payout region 32, will result in the stored wire portion 18" being unwound as shown in FIG. 8. The distance between the second wire connection element 14 and the periphery of the spool is fixed such that the stored wire portion 18" within the space 34 unwinds but is maintained within the space 34. In FIG. 8 the wire 18' is almost 50% extracted from the payout region 32. The wire portion 18" within the storage space 34 is almost fully unwound.

Figure 9:
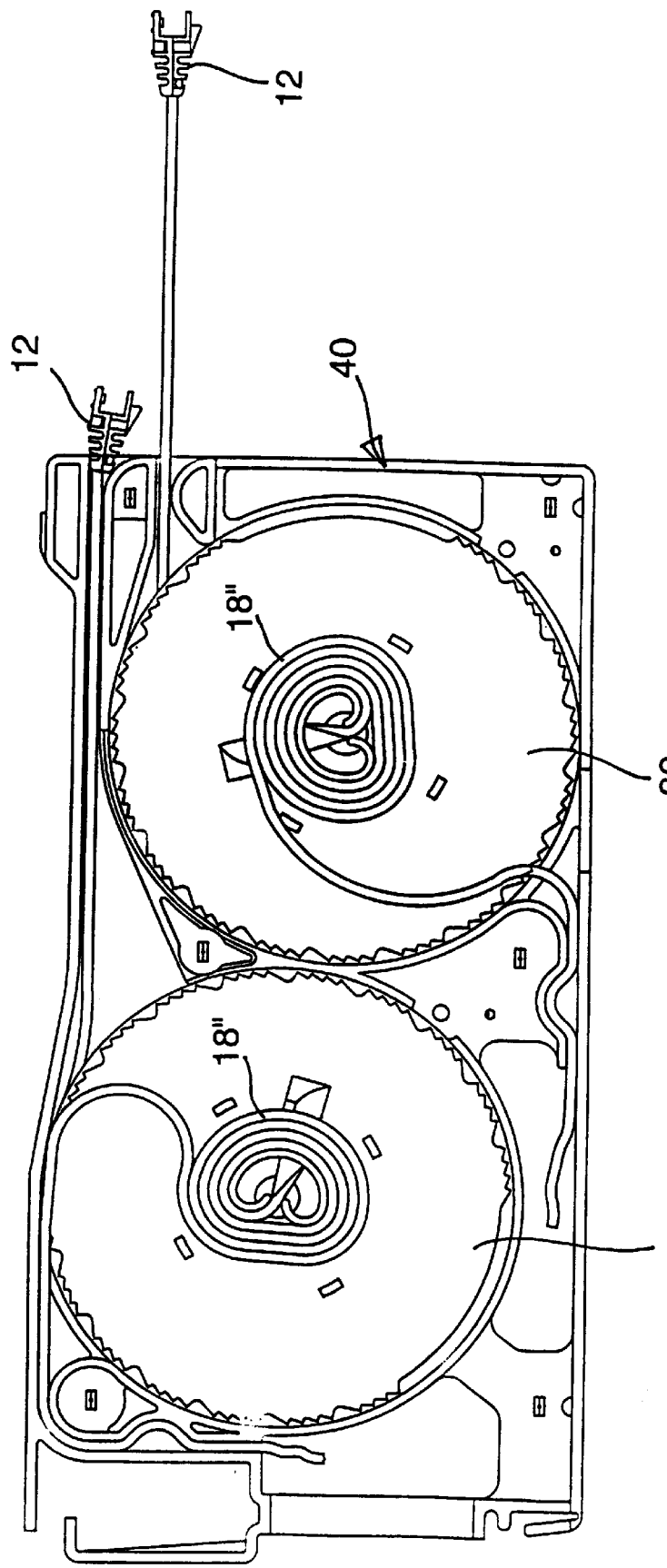
FIG. 9 is a side view of a cartridge showing the storage wire portion in a position after the wire has been extended out of the patch panel at a first distance.

FIG. 9 shows the extendable wire portion 18' fully extended from the payout space 32. In this fully extended position, the stored wire portion 18" in the storage space 34 is fully wound about the spool core 31 (center) of the storage space 34 in a second rotational direction. At this point, the extendable wire portion 18' cannot be further extended from the payout space 32.

The ratchet means 53 allows the wire 18 to be extended to any distance between the maximum extension length and the minimum extension length and then held in that position. This is convenient as the spring force of spring means 17 is no longer applied to the spool when the pawl element 60 is engaged with teeth 56 and therefore the wire 18 is no longer strained by the force of the spring motor 52. This is also a practical arrangement such that the technician rewiring or wiring using the patch panel of the invention can extend the wire to the length needed without the wire snapping back into the retracted position.

As the wire 18' returns from its fully extended position back to a retracted position, the portion of the wire in the storage space 34, shown in FIG. 9, unwinds as the spools rotates in a counterclockwise direction. Again the unwinding causes the wire to be pushed out towards the periphery of the storage space 34 until the wire is retracted beyond about 50% of its extended state. At this point the wire begins winding again as the spool continues to turn in the counterclockwise direction. This eventually results in a return to the state shown in FIG. 7.

While specific embodiments of the invention have been shown and described in detail to illustrate the application of the principles of the invention, it will be understood that the invention may be embodied otherwise without departing from such principles.

What is claimed is:

1. A patch panel, comprising:

a patch panel housing;

first electrical connector means movably connected to said patch panel housing;

second electrical connector means stationarily connected to said patch panel housing; and electrical interconnect means for connecting said first electrical connector means and said second electrical connector means and for maintaining a fixed electrical connection between said first electrical connector means and said second electrical connector means while allowing said first connector means to be moved away from and toward said housing, and for adjusting a position of said first electrical connector means with respect to said housing.

2. A patch panel according to claim 1, wherein said electrical interconnection means comprises a continuous electrically conductive wire extending between said first connector and said second connector and at least one spool with a first length of said wire wrapped around a first spool part and a second length of said wire wrapped around a second spool part, said first length of wire paying off said first spool part for changing a position of said first connector means relative to said housing.

3. A patch panel according to claim 2, first comprising spring means for exerting a spring force on said spool for maintaining said first wire length in a retracted state; and ratchet means for fixing a rotational position of said spool.

4. A patch panel according to claim 2, wherein said housing includes a cartridge case supporting one or more of said spools, said cartridge case being positioned within a housing shell.

5. A patch panel according to claim 4, wherein said cartridge includes an additional spool mounted therein and further comprising an additional first connector part, an additional second connector part and an additional electrical interconnect means connected to said first connector part and said second connector part.

6. A patch panel according to claim 4, further comprising a plurality of said cartridges.

7. A patch panel according to claim 5, further comprising a plurality of said cartridges.

8. A patch panel according to claim 1, wherein:

said electrical interconnect means includes a continuous wire electrically connecting said first and second electrical connector means.

9. A patch panel comprising:

a patch panel housing;

a spool arranged in said housing;

a continuous communication cable arranged in said housing and having first and second ends, said first end being movably connected to said patch panel housing, and said second end being fixed relative to said patch panel housing, said-continuous communication cable being windable and unwindable on said spool for movement of said first end toward and away from said housing while said second end remains fixed relative to said housing.

10. The patch panel in accordance with claim 9, wherein:

said continuous communication cable forms a substantially slip free connection between said first and second ends.

11. The patch panel in accordance with claim 9, wherein:

said continuous communication cable is uninterrupted between said first and second ends and forms a fixed communication path.

12. The patch panel in accordance with claim 9, wherein:

all elements of said continuous communication cable are arranged substantially fixed with respect to adjacent said elements.

13. The patch panel in accordance with claim 9, wherein:

said spool includes first and second spool parts;

said communication cable includes first and second cable parts, said first and second cable parts being wound on said first and second spool parts respectively to have winding and unwinding of said first cable part cause respective winding and unwinding of said second cable part.

14. The patch panel in accordance with claim 13, wherein:

said first and second spool parts are positioned side by side and rotate together.

15. The patch panel in accordance with claim 13, wherein:

said second cable part is shorter than said first cable part.

16. The patch panel in accordance with claim 13, wherein:

said first cable part is twice as long as said second cable part.

17. The patch panel in accordance with claim 13, wherein:

said first and second spool parts rotate together, and unwinding of said first cable part causes said second cable part to unwind and rewind in an opposite direction.

18. The patch panel in accordance with claim 16, wherein:

said first and second spool parts rotate together, and unwinding of said first cable part causes said second cable part to unwind and rewind in an opposite direction;

said first and second spool parts are positioned side by side.

19. The panel in accordance with claim 9, wherein:

said spool is rotatable in said housing for winding and unwinding of said continuous communication cable.

20. The patch panel in accordance with claim 18, wherein:

said communication cable is electrical.

* * * * *